US008554410B2

United States Patent
Stählin et al.

(10) Patent No.: US 8,554,410 B2
(45) Date of Patent: Oct. 8, 2013

(54) ROUTE GUIDANCE ASSISTANCE BY MOMENT SUPPORT AT THE STEERING WHEEL

(75) Inventors: Ulrich Stählin, Eschborn (DE); Mattias Strauss, Pfungstadt (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 496 days.

(21) Appl. No.: 12/747,002

(22) PCT Filed: Dec. 11, 2008

(86) PCT No.: PCT/EP2008/067360
§ 371 (c)(1),
(2), (4) Date: Jul. 15, 2010

(87) PCT Pub. No.: WO2009/074663
PCT Pub. Date: Jun. 18, 2009

(65) Prior Publication Data
US 2010/0280713 A1    Nov. 4, 2010

(30) Foreign Application Priority Data

Dec. 11, 2007  (DE) .......................... 10 2007 059 832
Dec. 11, 2008  (DE) .......................... 10 2008 061 302

(51) Int. Cl.
*B60W 50/16* (2012.01)
*G01C 21/36* (2006.01)
*B62D 6/00* (2006.01)

(52) U.S. Cl.
USPC ................. 701/41; 701/42; 701/60; 180/417; 180/446; 434/62

(58) Field of Classification Search
CPC .......... B60W 50/16; G01C 21/36; B62D 6/00
USPC ................. 701/41, 1, 42, 60; 180/417, 446; 434/62
See application file for complete search history.

(56) References Cited

U.S. PATENT DOCUMENTS

| 6,256,561 B1 | 7/2001 | Asanuma | |
| 7,468,573 B2 * | 12/2008 | Dai et al. | 310/317 |

(Continued)

FOREIGN PATENT DOCUMENTS

| DE | 199 48 913 | 5/2000 |
| DE | 100 42 375 | 5/2002 |

(Continued)

OTHER PUBLICATIONS

International Search Report for PCT/EP2008/067360 issued Apr. 6, 2009.

(Continued)

*Primary Examiner* — Tuan C. To
(74) *Attorney, Agent, or Firm* — RatnerPrestia

(57) ABSTRACT

A device and a method for route guidance assistance in a vehicle that is connected to a navigation system. In order to make it easier for the driver to follow a route calculated by a navigation system, an assisting device is provided for route guidance. The assisting device includes a control unit for generating a control signal for haptic feedback to the driver of the vehicle. As haptic feedback, the control unit can output an additional moment on the steering system of the vehicle, for example, the additional moment being negative when the vehicle departs from the travel route while being positive when the vehicle follows the calculated direction of the navigation route.

16 Claims, 4 Drawing Sheets

(56) References Cited

U.S. PATENT DOCUMENTS

| | | | |
|---|---|---|---|
| 7,788,032 B2* | 8/2010 | Moloney | 701/472 |
| 8,095,271 B2* | 1/2012 | Lee | 701/41 |
| 2002/0177471 A1* | 11/2002 | Kaaresoja et al. | 455/567 |
| 2004/0262063 A1* | 12/2004 | Kaufmann et al. | 180/169 |
| 2005/0184696 A1* | 8/2005 | Anastas et al. | 318/567 |
| 2006/0061545 A1* | 3/2006 | Hughes et al. | 345/156 |
| 2006/0113119 A1 | 6/2006 | Dudeck et al. | |
| 2006/0255683 A1* | 11/2006 | Suzuki et al. | 310/317 |
| 2006/0284849 A1* | 12/2006 | Grant et al. | 345/173 |
| 2007/0010938 A1 | 1/2007 | Kubota et al. | |
| 2007/0164852 A1 | 7/2007 | Litkouhi | |
| 2007/0179697 A1* | 8/2007 | Holler | 701/70 |
| 2007/0256885 A1* | 11/2007 | Ammon et al. | 180/417 |
| 2007/0265077 A1* | 11/2007 | Tom et al. | 463/37 |
| 2008/0027607 A1 | 1/2008 | Ertl et al. | |
| 2008/0070197 A1* | 3/2008 | Yu | 434/62 |
| 2008/0154460 A1* | 6/2008 | Uenuma et al. | 701/36 |

FOREIGN PATENT DOCUMENTS

| | | |
|---|---|---|
| DE | 102 12 782 | 10/2003 |
| DE | 102 61 176 | 7/2004 |
| DE | 10 2004 019 337 | 11/2005 |
| DE | 10 2004 022 266 | 12/2005 |
| DE | 10 2005 032 528 | 1/2007 |
| DE | 10 2006 000326 | 1/2007 |
| EP | 1 491 429 | 12/2004 |

OTHER PUBLICATIONS

German Search Report for DE 10 2008 061 302.9 dated Oct. 22, 2009.

* cited by examiner

ROUTE GUIDANCE ASSISTANCE BY MOMENT SUPPORT AT THE STEERING WHEEL

CROSS REFERENCE TO RELATED APPLICATIONS

This application is the U.S. national phase application of PCT International Application No. PCT/EP2008/067360, filed Dec. 11, 2008, which claims priority to German Patent Application No. 10 2007 059 832.9, filed Dec. 11, 2007, and German Patent Application No. 10 2008 061 302.9, filed Dec. 11, 2008, the contents of such applications being incorporated by reference herein.

FIELD OF THE INVENTION

The invention relates to the driver assistance technology for vehicles. In particular the invention relates to a device and a method for route guidance assistance in a vehicle that is connected to a navigation system as well as a computer-readable storage medium and a computer program element for carrying out the method.

BACKGROUND OF THE INVENTION

Assisting devices for motor vehicles have a high potential for the improvement of traffic safety, driving comfort and economy of resources. Therefore, increasingly assisting systems are used in modern motor vehicles, which support the driver in driving. Here, it is differentiated between passive assisting systems and technologies actively intervening into the driver process such as e.g. ESP (Electronic Stability Program) or lane departure warnings. Further driver assistance systems supporting the control of the vehicle are ABS (Antilock Brake System), TCS (traction control system) or EDS (Electronic Differential Lock).

For increasing the driving comfort navigation systems are used as driver assisting systems. The driver is relieved here by displaying and/or announcing by localization via GPS (Global Positioning System) the necessary turns until the set target point. In this way, a navigation system integrated into a motor vehicle can release driving recommendations, if a destination has been entered and/or programmed and/or stored before into the navigation system. Usually, navigation systems output the route guidances calculated by the navigation computer in visual and/or acoustic manner. Guidance instructions are output in particular when the vehicle approaches decision points, thus in particular intersections or the like. Typical guidance instructions output by the navigation system like e.g. "turn left after 50 meters" are based on distance values.

The vehicle driver has the problem that he must estimate distances exactly and that he must identify an intersection or the like correctly. Mainly in the peak hours in city traffic, at unclear intersections as well as with multi-lane roads the assistance usual with navigation systems cannot be sufficient. Whereas during a cross-country travel with few intersections the destination can be reached without any problems, in particular in case of cities, which can have many intersections or side roads at a narrow space, following of the route guidance will be possible only with increased concentration of the vehicle driver. Possible inattentiveness or misunderstood instructions can lead to detours or unexpected driving behavior, such as sudden deceleration based on too late or too early turning. Above all, the acoustic announcements can be misunderstood, since the announcements for the individual driver are reported too late or too early. Furthermore, in particular at the beginning of the use of a navigation system the acoustic as well as the visual route guidance can be misunderstood by the driver, if the navigation systems differ depending upon the manufacturer or version.

SUMMARY OF THE INVENTION

Therefore, an object of the present invention can be to provide an improved output of guidance instructions to the vehicle driver to make it easier for him to follow a route calculated by the navigation system.

The examples of embodiment of the invention described in the following equally relate to the assisting device, the system, the method, the computer program element and the computer-readable storage medium. In other words, the features specified with regard to the assisting device can be implemented also in the system, the method, the program element or the computer-readable medium and vice versa.

In accordance with an exemplary embodiment of the invention an assisting device for route guidance of a vehicle that is connected to a navigation system is provided. Said assisting device comprises a control unit for generating a control signal for haptic feedback to the driver of the vehicle and the haptic feedback makes it easier for the driver to follow a route calculated by the navigation system.

Thus, the assisting device according to aspects of the invention can guide a vehicle driver by means of haptically output guidance instructions along a route calculated before towards a user-defined destination. Here, the driver can enter by menu settings of the navigation system whether he receives the guidance instructions for a certain destination guidance only haptically or by including visual or acoustic guidance instructions. Since the visual and auditory sense of a human is already overloaded in many situations, it is advantageous to use the sense of touch for a targeted information transfer. In this way the invention contributes to the fact that the vehicle driver is not so easily distracted from the traffic by the instructions of the navigation system and thus it contributes to traffic safety.

Furthermore, the vehicle driver has the possibility to assign the haptic feedbacks only to certain decision points such as turning maneuvers and/or lane changes. Here, a haptic feedback, i.e. a haptic reaction in the vehicle, behaves for example in case of left turning maneuvers contrary and/or for the driver easily distinguishable to the haptic reaction in the right turning maneuver. So, the location of a tactile stimulus can indicate the direction (right or left foot over vehicle floor or right or left leg over driver's seat), while the stimulus frequency can indicate the distance to the turning place.

The vehicle is for example a motor vehicle, such as a car, a bus or a truck, or also a rail vehicle, a ship, an aircraft, such as a helicopter or an airplane.

In accordance with an other example of embodiment of the invention an assisting device is indicated, the haptic feedback comprising a vibration of the steering wheel.

Here, the control unit of the assisting device generates a haptic feedback by a vibration (for example with the aid of a corresponding actuator) with a certain amplitude and frequency, which is added to the normal steering wheel functions and thus is haptically perceived by the driver. In addition, the vibration can only be generated, if the vehicle is in an uncritical driving situation, e.g. when keeping certain speeds such as city speeds. Furthermore, in advance or when starting a turning maneuver according to the calculated direction a specific signal can be output, by e.g. only the right and/or left steering wheel side generating a haptic signal.

Besides, it is advantageously provided that a vibration of the steering wheel can warn the driver when departing from the user-defined route. This "shaking effect" can give the driver the feeling that he is driving in a furrow. In this way the driver is prompted not to depart the lane and/or travel route.

In accordance with another example of embodiment of the invention the haptic feedback comprises an additional moment ($M_z$) on the steering of the vehicle, which was generated for example with the aid of a servo-motor.

By locking a moment onto the steering it is made easier to follow the planned route. In this case, the route guidance is effected by the fact that the current position of the vehicle is determined and is compared with the route by a position sensor technology. When departing and/or correctly following the route and thus the calculated driving maneuvers, such as turning, U-turns or lane changing, a haptic signal is output to the vehicle driver by the change of the steering moment level. These guidance signals can be transmitted to the driver continuously or discontinuously. With a discontinuous signal adjustment the frequency of the signal output can be increased when approaching a decision point calculated by the navigation system such as e.g. an intersection.

The steering device can be provided for example with an EPAS (Electric Power Assisted Steering) or can also be embodied as a Steer-By-Wire and/or Fly-by-Wire-System. These technologies advantageously comprise actuators, which permit an implementation of a haptic feedback.

In accordance with a further example of embodiment of the invention the control unit of the assisting device adds a negative additional moment ($M_z<0$) onto the steering when the calculated route is departed in such a manner that for maintaining or increasing the steering moment a higher manual moment must be transmitted into the steering.

In this way, similar to the "shaking effect" the driver is given the feeling of a virtual "roadway furrow", the "roadway furrow" matching with the calculated roadway and/or travel route of the navigation system. Here, a servo-drive with an electric motor can serve for implementing the change of the steering moment, by the control unit of the assisting device being able to lock a negative additional moment onto the electric steering system (EPAS), like a virtual "weight" on the steering wheel. The regulation causes an increase of the manual moment of the driver, if a departure of the travel route was calculated by the control unit. Here, the additional hand moment for obtaining the same steering angle proportional the departure of the calculated travel route can be adjusted.

According to aspects of the invention, the control unit of the assisting device is embodied to add a positive additional moment ($M_z>0$) on the steering in direction of the calculated route to facilitate the steering of the vehicle.

In this way, the driver can be supported to follow the travel route and/or to keep in the calculated lane with a targeted, supporting change of steering moment. For example with a turning maneuver to the left, left-side oriented steering maneuvers are facilitated. Besides, advantageously after a possible departure from the calculated travel route a supporting positive additional moment makes it easier to find the way back into the lane, i.e. onto the required travel route.

According to a further aspect of the invention, the control unit of the assisting device is embodied to output a positive additional moment ($M_z>0$) before and during maneuvers calculated by the navigation system, the maneuvers being selected from a group consisting of a steering angle ($\delta$) larger than a user-defined limiting value, a turning maneuver and a lane change.

In this way, positive steering wheel supports can be coupled to certain decision points, which were calculated by the navigation system. Here, the driver can enter limiting values and/or certain maneuvers via a suitable man-machine interface e.g. the menu keys of the navigation system. In doing so, the driver can select for example that a positive additional moment is transmitted to the driver only starting from a steering angle $\delta$ to be turned which is higher than 30°. The mentioned threshold value of 30° is to be considered as an example and can be adapted at will. Here, the driver can also decide whether and at which distances to the decision point he wants to receive in advance a guidance instruction via a positive additional moment from the assisting device. Apart from driving maneuvers to be calculated such as lane changes and turning maneuvers, additional decision points can be entered depending on the wish of the driver. Instead of an input by the driver the maneuvers specified above can be called already as pre-determined criteria by a storage unit of the assisting device.

According to a further aspect of the invention, the assisting device comprises a navigation system interface, which is embodied as an input interface for the reception of current travel route parameter interfaces ($x_N, y_N, x_N', y_N', x_N'', y_N''$) calculated by the navigation system as well as a vehicle interface, which is embodied as an input interface for the reception of vehicle parameters such as location-time-condition information ($x_F, y_F, x_F', y_F', x_F'', y_F''$), steering angle $\delta_F$ and steering moment $M_F$ of a vehicle.

Via the navigation and/or vehicle interface for example the position data of the vehicle can be transmitted to the control unit. The navigation system on its part uses the position data to compare it with the information of digital cards. In this way, a reasonable route calculation of the current position to the travel destination and the destination guidance can be determined. The current travel route parameters ($x_N, y_N, x_N', y_N', x_N'', y_N''$) calculated by the navigation can be received via the interface by the control unit for further processing.

In advantageous manner also the different vehicle parameters ($x_F, y_F, x_F', y_F', x_F'', y_F''$), steering angle $\delta_F$ and steering moment $M_F$ can be received. In this way, the travel situation of the vehicle can be described. The travel speed $x_F', y_F'$ is determined by a sensor for example a tachometer or the signals of the wheel speed sensors. The acceleration data $x_F''$, $y_F''$ cover for example also the lateral acceleration of a vehicle, which can be output by an EPS support system. All received vehicle parameters are supplied to the computing unit and/or the control unit.

According to a further aspect of the invention, the assisting device comprises a surrounding field sensor interface, which is embodied to receive location-time-condition information ($x_u, y_u, x_u', y_u', x_u'', y_u''$) of a potential obstacle.

With the help of the surrounding field sensor interface information on position, movement, relative speed and acceleration of objects with regard to a determined and/or calculated position of the own vehicle can be determined in an advantageous manner. Systems of the surrounding field sensor technology usually comprise video sensors, infrared sensors, ultrasonic sensors, radar or lidar. For example a radar sensor can monitor the front portion and back area of the vehicle in such a way that a control unit of the assisting device can transmit via the surrounding field sensor interface the location, relative speed, as well as acceleration $x_u, y_u, x_u', y_u', x_u'', y_u''$ of a movable obstacle. If, when turning right for example a vehicle is localized on the bicycle path, the travel route calculation would be corrected while taking into consideration the obstacle and no more turning recommendation would be released.

According to a further aspect of the invention, the assisting device comprises a control unit (11), which is embodied to evaluate the vehicle parameters ($x_F$, $y_F$, $x_F'$, $y_F'$, $x_F''$, $y_F''$, $\delta_F$, $M_F$) and data of a potential obstacle ($x_u$, $y_u$, $x_u'$, $y_u'$, $x_u''$, $y_u''$) relative to the calculated travel route parameters ($x_N$, $y_N$, $x_N'$, $y_N'$, $x_N''$, $y_N''$) and to determine steering parameters such as route-specific steering angle $\delta_N$ and additional moment $M_Z$ and to output only one control signal to an actuator of the steering of the vehicle via an output interface, if the surrounding field sensor data ($x_u$, $y_u$, $x_u'$, $y_u'$, $x_u''$, $y_u''$) have not determined an obstacle on the calculated travel route.

In this way, on the basis of the data received by the control unit a route-specific steering angle $\delta_N$ can be calculated, which is required in the current driving situation to guide the vehicle on the calculated travel route. Thus, the control unit can calculate the difference between the calculated steering angle $\delta_N$ and the steering angle $\delta_F$ provided by the driver. The controlling torque to be additionally applied by the assisting device is then adjusted in dependence of this steering angle difference with the aid of a controlling element and is additively superimposed to the hand moment $M_H$ applied by the driver via the steering wheel.

Besides, in advantageous manner the data of the surrounding field sensors can be used as test data. If a stationary or movable potential obstacle is found on the calculated destination route, no more additional moment shall be applied on the steering wheel. If necessary, a warning by means of a haptic feedback such as a vibration on the steering wheel can be effected. If the validation of the travel route results in the fact that for example an access road is hindered by a construction vehicle, the control unit can pass this information via the navigation interface on to the navigation system, so that a new destination guidance can be calculated. Only if again validated data is supplied to the control unit with regard to the destination route, an additional moment can be passed on to the driver.

Furthermore, the strength of the additional moment can be dependent not only on the steering angle difference but also on the travel speed of the vehicle. For safety reasons the additional moment can be reduced, if the speed of the vehicle increases.

According to a further aspect of the invention, the control unit of the assisting device is embodied to block the output of a positive additional moment ($M_z>0$) to the output interface, if a maximum speed ($x_{max}'$, $y_{max}'$) was exceeded.

The introduction of a maximum speed serves for the safety of the driver, as in this way the physical limits of the vehicle can be adhered to. Thus, for example a change of the steering moment is blocked with a sporty driving manner, as otherwise the risk is involved that when snatching the steering wheel the driver loses control over his vehicle. Moreover, by means of components of the vehicle dynamics control such as e.g. an Electronic Stability Program (ESP) a suitable limit value can be stored in the control unit, at which the steering wheel support is blocked. Besides, it is possible that in place of the steering wheel support a vibration is generated to inform the vehicle driver that a limit value has been reached. In this way, the driver can be warned of a critical situation.

According to a further aspect of the invention, an assisting device is provided, wherein the haptic feedback is effected via an active accelerator. Here, the accelerator can set a force against the driver foot or can reduce the necessary force for pushing the accelerator or can provide the accelerator with a shaking. Via a shaking the driver can be informed on the fact e.g. that he must turn shortly. Also for this a counter force in the accelerator can be used, as typically before a curve also the speed must be reduced.

According to a further aspect of the invention, an assisting system is indicated with an assisting device, the assisting system comprising a navigation system, a position indicating system, vehicle sensors and a servo-motor.

By the integration possibility of the mentioned sensor and system components in an assisting system it can be reverted to already present information sources and interfaces such as vehicle sensor technology or vehicle systems and an efficient linking of the systems is possible. In this way, an assisting system as a single solution and/or so-called isolated system is avoided.

Mostly a GPS-receiver is used as a position indicating system. GPS is substitutional for all Global Navigation Satellite Systems (GNSS), such as e.g. GPS, Galileo, GLONASS (Russia), COMPASS (China) or IRNSS (India). Here, it should be pointed out that the determination of the position of the vehicle can be effected not only via GPS but also via a cell positioning. This makes sense in particular with the use of GSM-, UMTS- or LTE-networks and/or WiMAx-networks. Also a positioning via WLAN is possible.

According to a further aspect of the invention, a motor vehicle with an assisting device according to invention is indicated.

According to a further aspect of the invention, the assisting method for route guidance of a vehicle connected to a navigation system comprises the generation of a control signal for a haptic feedback to the driver of the vehicle, the haptic feedback making it easier for the driver to follow a route calculated by the navigation system.

According to a further aspect of the invention, an assisting method comprises on the one hand the detection of a location-time-condition information calculated according to the travel route of the vehicle by the navigation system ($x_N$, $y_N$, $x_N'$, $y_N'$, $x_N''$, $y_N''$), on the other hand the detection of a location-time-condition information ($x_F$, $y_F$, $x_F'$, $y_F'$, $x_F''$, $y_F''$) as well as steering parameters ($\delta_F$, $M_F$) of a vehicle. Furthermore, the assisting method comprises an evaluation of the detected location-time-condition information of the navigation system ($x_N$, $y_N$, $x_N'$, $y_N'$, $x_N''$, $y_N''$) and of the vehicle parameters ($x_F$, $y_F$, $x_F'$, $y_F'$, $x_F''$, $y_F''$; $\delta_F$, $M_F$) and a determination and output of an additional moment ($M_z$) on the steering of the vehicle, the additional moment being negative when the vehicle departs from the travel route ($M_z<0$) and being positive when the vehicle follows the calculated direction of the navigation route ($M_z>0$).

According to a further aspect of the invention, a computer program element is provided, which, if implemented by a processor, is embodied to carry out a method according to the invention. The computer program element can be for example on a microprocessor of a control unit, which is embodied to control the moment support of the steering wheel. The control unit, which includes among other things the evaluation electronics, can be formed for example by an electronic data processing system with one or several microprocessors and associated software.

According to a further aspect of the invention, a computer-readable storage medium is indicated, on which the computer program element is stored, which, if implemented on a processor, instructs the processor to accomplish the following process steps: generation of a control signal for a haptic feedback to the driver of the vehicle, the haptic feedback making it easier for the driver to follow a route calculated by the navigation system. Possible storage media for the computer program product are for example disks, CDs, DVDs, hard disks, USB memory sticks, flash memories or the like. Furthermore, the computer program element can be stored on an internet server and can be transmitted from there into the storage element of the control unit.

BRIEF DESCRIPTION OF THE DRAWINGS

In the following examples embodiments of the invention are described with reference to the drawings, in which.

Figure 1:
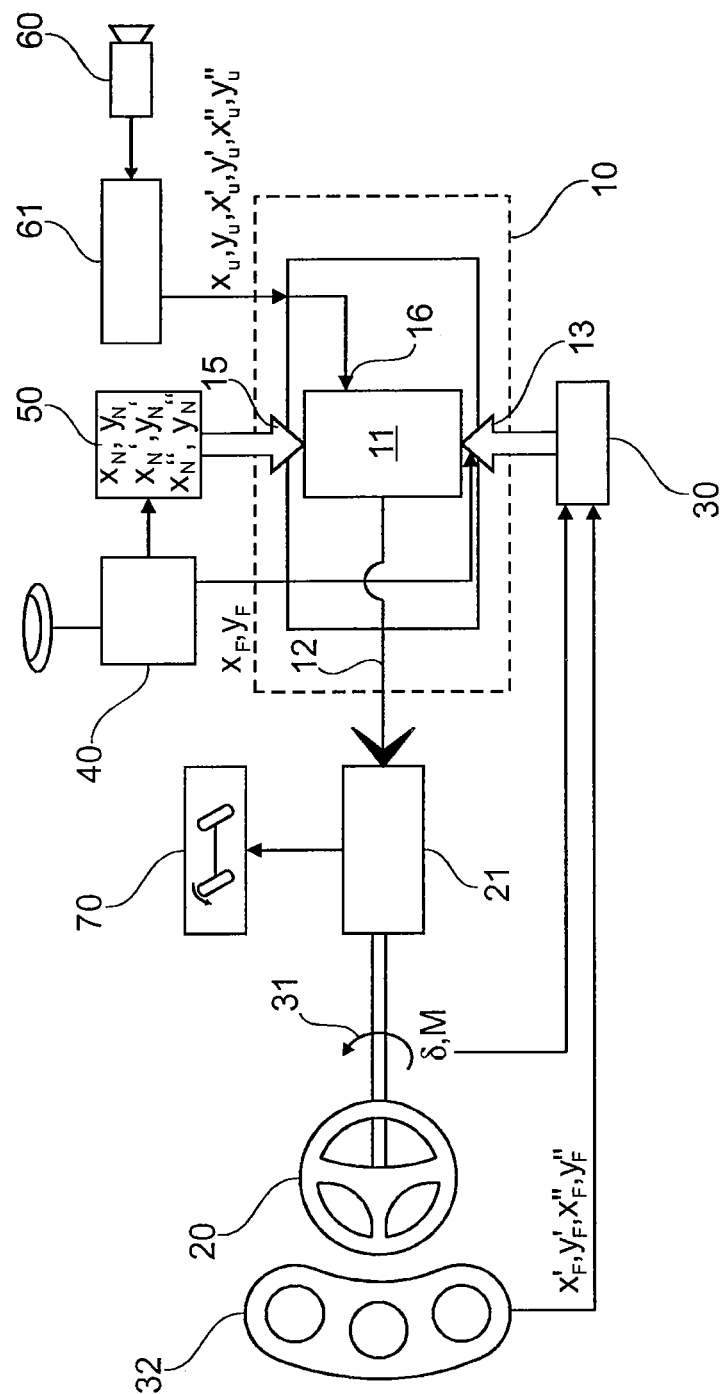
FIG. 1 shows a schematic representation of a form of embodiment of the assisting device according to aspects of the invention.

The representations in the drawings are schematically and not full-scale.

DETAILED DESCRIPTION OF THE INVENTION

In the following descriptions of the drawings the same reference numerals are used for the same or similar elements.

FIG. 1 shows a schematic representation of an exemplary form of embodiment of the invention. The assisting device 10 comprises a control unit 11 with interfaces. On the one hand the control unit has a navigation interface 15, which is embodied to receive the current travel route parameters ($x_N$, $y_N$, $x_N'$, $y_N'$, $x_N''$, $y_N''$) calculated by the navigation system. On the other hand the control unit comprises a vehicle parameter interface 13, which receives from the vehicle electronic unit 30 vehicle parameters such as location-time-condition information ($x_F$, $y_F$, $x_F'$, $y_F'$, $x_F''$, $y_F''$) as well as steering parameters such as steering angle δ and steering moment M. The vehicle electronics 30 detects here the current driving situation for example via vehicle measuring sensors 32 such as the tachometer for the speed $x_F'$, $y_F'$ and sensors for the measurement of the lateral acceleration. The position indicating system 40 can determine the local data of the vehicle $x_F$, $y_F$ for example with the aid of a GPS-receiver 40. The determined position of the vehicle can be transmitted both via the vehicle parameter interface 13 and indirectly via the navigation system 50 and corresponding interface 15 of the control unit 11.

In is to be noted at this point that the data transfer between the individual components can be effected both wired and wire-less.

Furthermore, it is possible to include also surrounding field sensor data into the evaluation of the navigation route data and vehicle parameters. Via the surrounding field sensor interface 16 the control unit 11 can receive the location-time-condition information ($x_u$, $y_u$, $x_u'$, $y_u'$, $x_u''$, $y_u''$) of a potential obstacle. A camera 60 with an evaluation electronics 61 is shown as an example for a surrounding field sensor. Also several cameras can be installed at the vehicle to be able to detect a potential obstacle and its movement both in the front region including side region and in the back area of the vehicle. For travels in the dark or poor weather for example the use of infrared cameras is suitable. Precisely in such difficult driving conditions the use of the assisting device according to aspects of the invention is of great avail. Instead of a camera also ray sensors (radar, lidar) or communication technology (vehicle-to-x communication, e.g. via the communication standard IEEE802.11p) can be used.

The control signal determined on the basis of the detected data is passed on to the driver via the output interface 12. Via an actuator 21 for example the steering moment M of the steering wheel 20 can be changed. The steerable front wheels 70 of a vehicle are set by the actuator 21 via a steering connection not shown. Here, the actuator 21 can be embodied for example as a servo-motor, which can apply on the steering wheel 20 an additional moment determined in the control unit 11.

In FIG. 1 the hand moment outlined with the arrow 31 effects a left position of the front wheels 70. If an additional moment is locked on by the control unit via the control signal, a larger and/or smaller hand moment M must be applied by the driver to maintain the same steering moment and/or turning angle of the front wheels.

Figure 2:
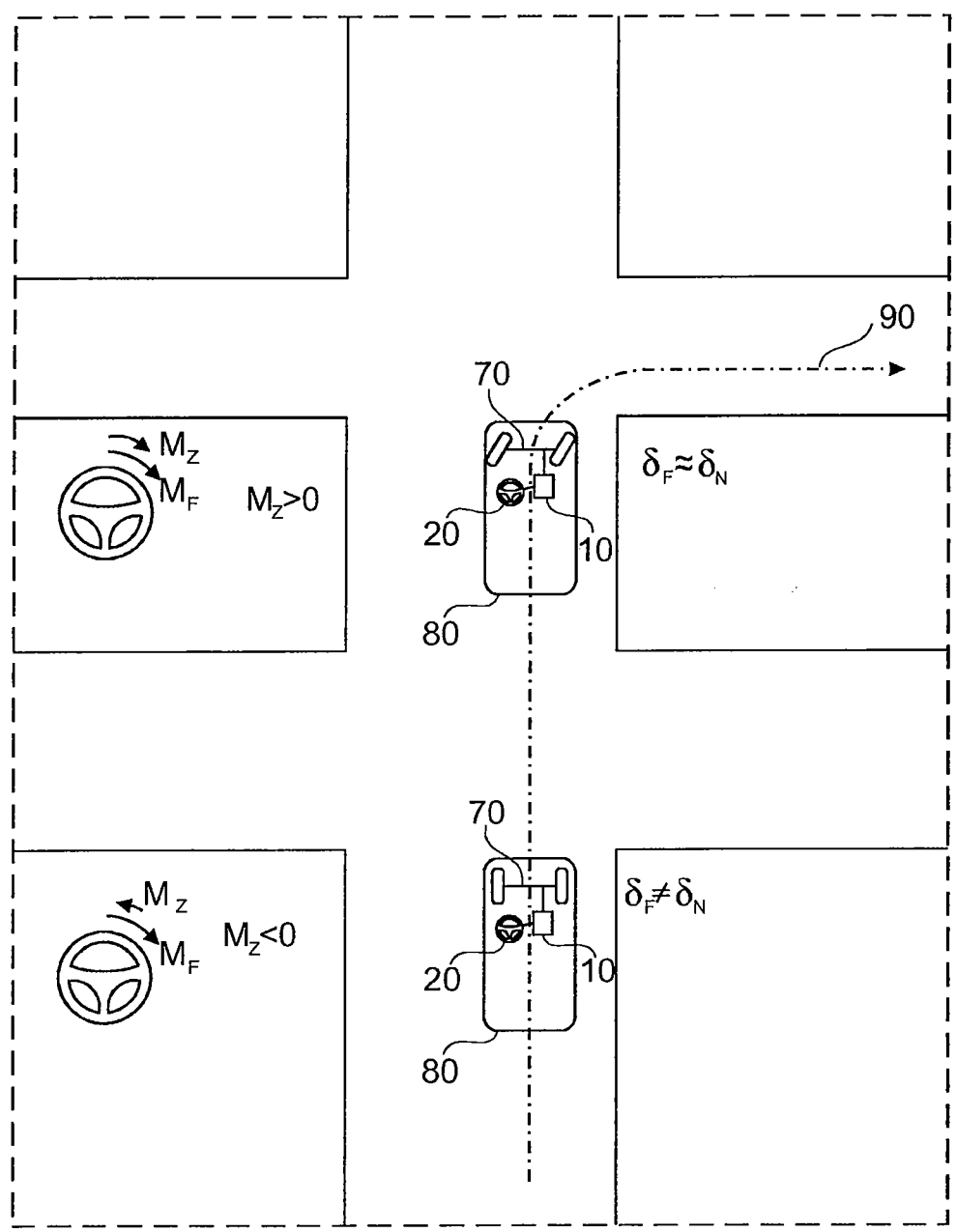
FIG. 2 shows schematically a map section for the explanation of two possible additional moments on the basis of an exemplary turning maneuver.

The scheme represented in FIG. 2 shows the locking of a negative additional moment $M_z<0$ and/or a positive additional moment $M_z>0$ on the steering wheel 20 on the basis of an example of a turning maneuver calculated by the navigation system and of an exemplary driving behavior of a motor vehicle driver. FIG. 2 shows a map section with 2 intersections, the motor vehicle 80 being on the calculated travel route 90.

The destination input of the vehicle driver resulted in that the motor vehicle was to turn right at the intersection second in direction of travel. In the represented scheme the assisting device 10 evaluates the received data in each case shortly before the intersections. In the shown case of example the driver understands the instructions of the navigation system in such a way that he erroneously wants to turn right already at the first intersection instead of the second intersection. Therefore, the comparison of the driving parameter data with the navigation route parameters at the first intersection, and that the comparison of the steering angle $δ_F$ set by the driver with the steering angle $δ_N$ calculated by the control unit 11, results in a deviation: $δ_F \neq δ_N$. Consequently, the determined control signal generates a negative additional moment ($M_z<0$) on the steering 20. The slight counter moment $M_z$, which is directed against the hand moment $M_F$ of the driver, is schematically clarified by the arrows and arrow directions along the steering wheel (see case study $M_z<0$ FIG. 2 down left). FIG. 2 shows that the negative additional moment prevents a right-hand turn of the steering wheel and thus of the front wheels 70 and signals the driver in time not to turn wrongly into the first road and to follow the correct travel route straight on.

Furthermore, FIG. 2 shows that the driver at the second intersection steers into the correct direction ($δ_F \approx δ_N$) and thus follows correctly the calculated travel route 90. To make it easier for the driver to follow, in this case a positive additional moment $M_z>0$ is locked onto the steering 20 from the assisting device 10. This is graphically illustrated in simplified manner by the enlarged steering wheel sketch $M_z>0$ and the rectified steering moment arrows of the hand moment $M_H$ and the additional moment $M_z$. The steering supported by the assisting device 10 results in a correct right positioning of the front wheels 70.

Figure 3:
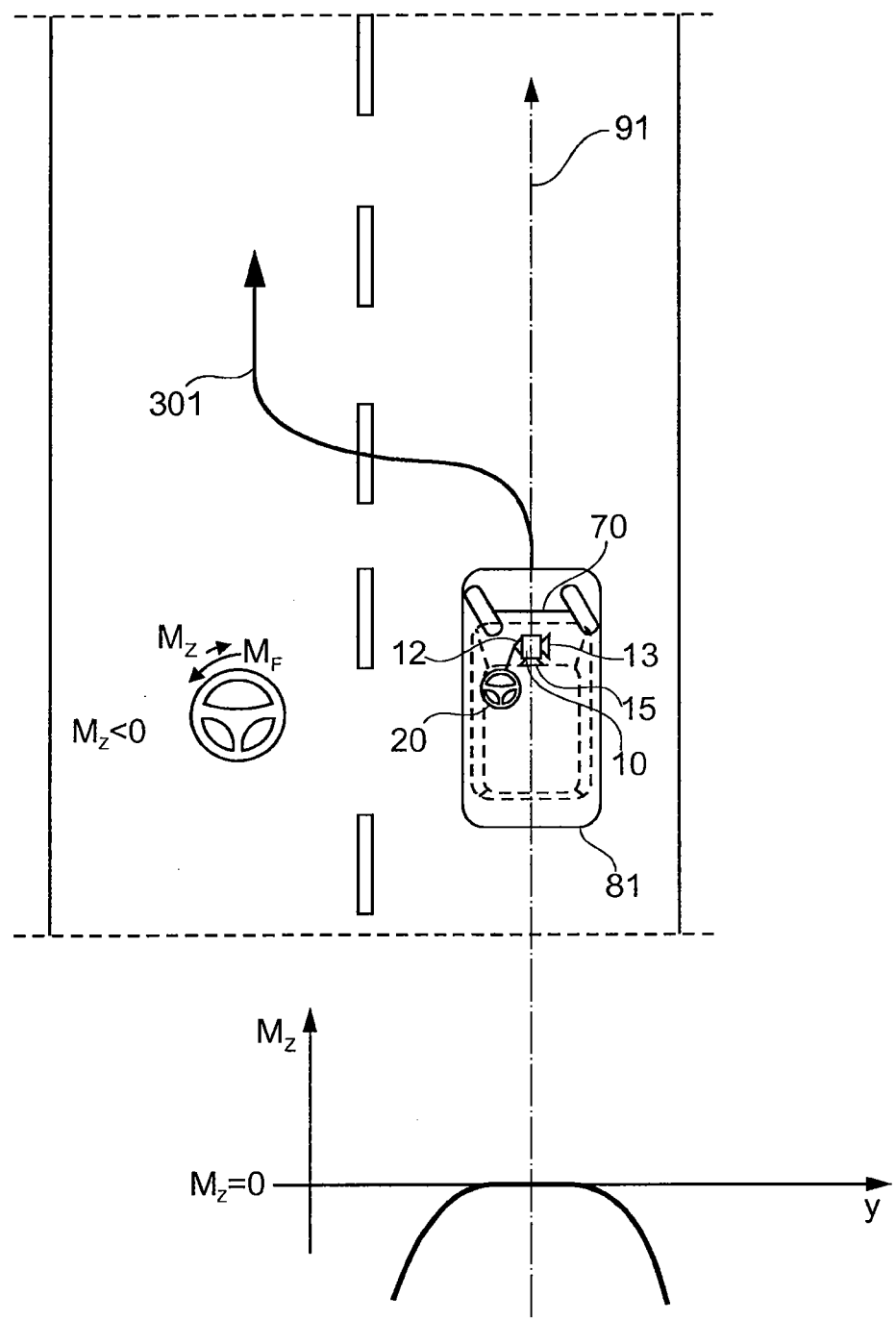
FIG. 3. shows a schematic representation of lane change maneuver not supported by the assisting device and the function of the negative additional moment depending on the vehicle position relative to the route lane.

FIG. 3 shows a schematic representation of the assisting device function at the example of a lane change maneuver. The lane cutout shown in FIG. 3 could show for example a two-lane inner-city highway. In the shown case of example the motor vehicle driver wants to steer the motor vehicle 81 from the right lane into the left lane (lane change desired by the driver indicated by arrow 301). However, the destination route 91 plans to keep in the current lane.

The continuous evaluation of the data detected via the navigation interface 15 and the driving parameter interface 13 results in that the steering angle of the driver $\delta_F$ does not match with the steering angle $\delta_N$ necessary for the calculated route. Therefore, a negative additional moment $M_z<0$ is locked onto the driver's steering. Here, smaller deviations from the target lane are correlated with small counter-moments $M_z$, as is schematically illustrated in the representation of the function $M_z$ depending on the location y. The function sketch shows that when keeping in the lane 91, no additional moment is locked on, whereas when departing the lane the negative additional moment $M_z$ increases with the distance to the lane center.

In a case not illustrated, the assisting device, however, could support a lane change, after surrounding field sensors have detected an obstacle in front of the vehicle. This would prevent following of the original travel route. In this case the travel route would be re-calculated and the driver's left-turning would be supported by a positive additional moment.

Figure 4:
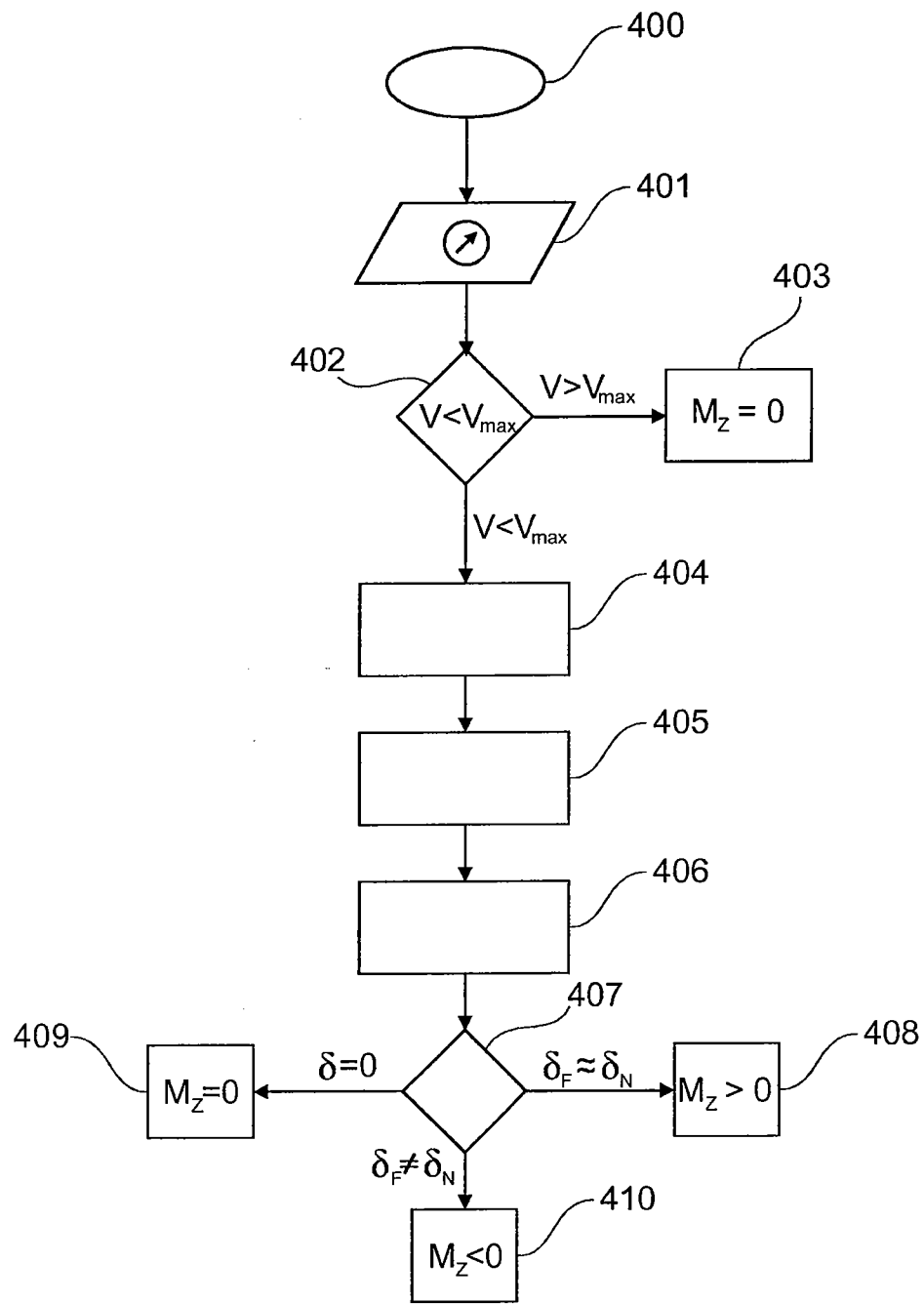
FIG. 4. shows a flow chart of a method in accordance with an example of embodiment of the invention.

FIG. 4 shows an assisting method according to aspects of the invention for route guidance of a vehicle connected to a navigation system, by a control unit generating a control signal for a haptic feedback to the driver of the vehicle, wherein the generated signal makes it easier to follow a route calculated by the navigation system.

In step 400 the method for supported route guidance begins in that the vehicle driver enters a destination input into the navigation system connected to the vehicle. In step 401*a* measurement sensor information such as for example the vehicle speed or lateral acceleration is detected. Then, in step 402, the measurement information v (actual value) is compared with the predetermined limit value $v_{max}$ by the control unit. If the actual value v is higher than the limit value $v_{max}$, as e.g. with a sporty driving, the control signal is not output in form of an additional moment on the steering by the control unit ($M_z=0$). If the actual value v is smaller than the nominal value $v_{max}$, the next process step 404 is initiated, i.e. detection of a location-time-condition information of the vehicle, calculated in accordance with a travel route by the navigation system ($x_N$, $y_N$, $x_N'$, $y_N'$, $x_N''$, $y_N''$). Thereafter the process step 405 follows, which includes detection of a location-time-condition information ($x_F$, $y_F$, $x_F'$, $y_F'$, $x_F''$, $y_F''$) as well as steering parameters ($\delta_F$, $M_F$) of a vehicle. In step 406 the detected location-time-condition information of the navigation system ($x_N$, $y_N$, $x_N'$, $y_N'$, $x_N''$, $y_N''$) and the vehicle parameters ($x_F$, $y_F$, $x_F'$, $y_F'$, $x_F''$, $y_F''$, $\delta_F$, $M_F$) are evaluated and thus a steering angle $\delta_N$ required for following the route is calculated. In the following process step the calculated $\delta_N$ is compared with the current $\delta_F$. In the case that the driver has not actuated a hand moment for steering, no additional moment ($M_z=0$) can be locked on, as is shown in step 409. Process step 408 shows the case, if the driver steers into the direction of the steering angle ($\delta_F \approx \delta_N$) calculated by the navigation system, in other words if the route is followed. This is supported by the output of a positive additional moment ($M_z>0$) on the steering. In case the steering angles do not match and deviate from each other, as e.g. in the case, if the driver wants to turn too early, the process step 410 occurs by giving a negative additional moment ($M_z<0$) on the steering.

The same method is applicable on another haptic feedback such as e.g. vibration at the steering wheel. Here, when reaching or exceeding a limit value a warning signal can be output in process step 403.

It is to be pointed out complementary that "including" and "comprising" does not exclude other elements or steps and "a" or "an" does not exclude plurality. Furthermore, it is pointed out that features or steps, which have been described with reference to one of the above examples of embodiments can be used also in combination with other features or steps of other above-described examples of embodiments

The invention claimed is:

1. An assisting device for route guidance of a vehicle connected to a navigation system, the assisting device comprising:
 a control unit for generating a control signal for a haptic feedback to a driver of the vehicle, the haptic feedback indicating navigation directions to the driver based on a route calculated by the navigation system and a steering input by the driver,
 wherein the haptic feedback aids the steering input of the driver by:
  adding a negative moment to the steering when the vehicle is departing from the calculated route, such that the driver is required to increase the steering input to maintain driving on the departed route, and
  adding a positive moment to the steering in a direction of the calculated route to facilitate steering of the vehicle on the calculated route.

2. An assisting device according to claim 1, the haptic feedback comprising a vibration of the steering wheel.

3. An assisting device according to claim 1, the haptic feedback comprising an additional moment ($M_Z$) on a steering system of the vehicle.

4. An assisting device according to claim 1, the control unit being configured to output a positive additional moment ($M_Z>0$) before and during maneuvers calculated by the navigation system, the maneuvers being selected from the group consisting of:
 a steering angle ($\delta$) larger than a user-defined limit value;
 a turning maneuver; and
 a lane change.

5. An assisting device according to claim 1, further comprising:
 a navigation system interface, which is embodied as an input interface for receiving current travel route parameters calculated by the navigation system; and
 a vehicle parameter interface, which is embodied as an input interface for receiving vehicle parameters including location-time-condition information, a steering angle $\delta_F$, and/or a steering moment $M_F$ of a vehicle.

6. An assisting device according to claim 5, further comprising:
 a surrounding field sensor interface, which is embodied to receive location-time-condition information of a potential obstacle.

7. An assisting device according to claim 6, the control unit being configured to evaluate the vehicle parameters and data of a potential obstacle relative to the calculated travel route parameters and to determine steering parameters and to output only one control signal to an actuator of a steering system of the vehicle via an output interface, if data from the surrounding field sensor does not indicate an obstacle on the calculated travel route.

8. An assisting device according to claim 6, wherein the steering parameters include a route-specific steering angle $\delta_N$ and an additional moment $M_Z$.

9. An assisting device according to claim 1, the control unit being configured to block an output of a positive additional moment ($M_Z>0$) to an output interface, if a maximum speed ($X_{max}'$, $Y_{max}'$) was exceeded.

10. An assisting device according to claim 1, the haptic feedback comprising a vibration of an active accelerator.

11. An assisting device according to claim 1, the haptic feedback comprising an additional force on an accelerator of the vehicle.

12. An assisting system comprising:
an assisting device according to claim 1;
a navigation system;
a position indicating system;
vehicle sensors; and
a servo-motor.

13. A motor vehicle comprising:
an assisting device according to claim 1.

14. An assisting method for route guidance of a vehicle connected to a navigation system, the assisting method comprising generating a control signal for a haptic feedback to a driver of the vehicle, the haptic feedback indicating navigation directions to the driver based on a travel route calculated by the navigation system and a steering input by the driver,
wherein the haptic feedback aids the steering input of the driver by:
adding a negative moment to the steering when the vehicle is departing from the calculated route, such that the driver is required to increase the steering input to maintain driving on the departed route, and
adding a positive moment to the steering in a direction of the calculated route to facilitate steering of the vehicle on the calculated route.

15. An assisting method according to claim 14, the assisting method comprising the steps of:
detecting a location-time-condition information calculated according to the travel route of the vehicle by the navigation system;
detecting a location-time-condition information as well as steering parameters ($\delta_F$, $M_F$) of a vehicle;
evaluating the detected location-time-condition information of the navigation system and of vehicle parameters;
determining and outputting an additional moment ($M_Z$) on a steering system of the vehicle, the additional moment being negative when the vehicle departs from the travel route ($M_Z<0$) and being positive when the vehicle follows the calculated direction of the navigation route ($M_Z>0$).

16. A non-transitory computer-readable storage medium, on which a computer program element is stored, which, if implemented on a processor, instructs a processor to generate a control signal for a haptic feedback to a driver of the vehicle, the haptic feedback indicating navigation directions to the driver based on a route calculated by a navigation system of the vehicle and a steering input by the driver,
wherein the haptic feedback aids the steering input of the driver by:
adding a negative moment to the steering when the vehicle is departing from the calculated route, such that the driver is required to increase the steering input to maintain driving on the departed route, and
adding a positive moment to the steering in a direction of the calculated route to facilitate steering of the vehicle on the calculated route.

* * * * *

UNITED STATES PATENT AND TRADEMARK OFFICE
CERTIFICATE OF CORRECTION

PATENT NO. : 8,554,410 B2  
APPLICATION NO. : 12/747002  
DATED : October 8, 2013  
INVENTOR(S) : Stählin et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 531 days.

Signed and Sealed this

Fifteenth Day of September, 2015

Michelle K. Lee
*Director of the United States Patent and Trademark Office*